June 23, 1953 S. E. HINKLE 2,642,853
MOUNTING FOR AIRCRAFT ENGINE COWLS
Filed Jan. 17, 1950
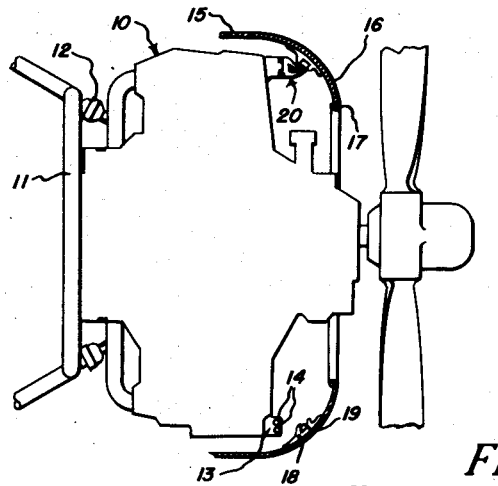
FIG. 1.
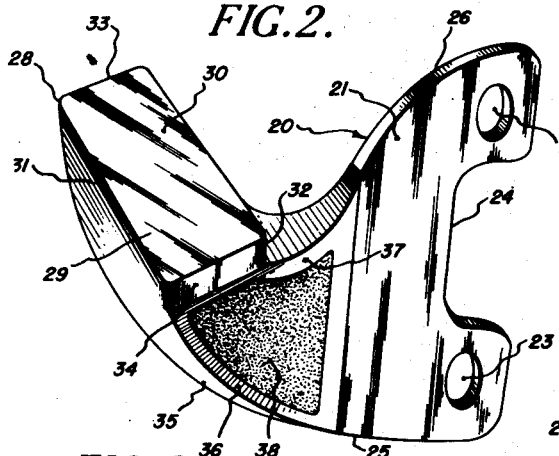
FIG. 2.
FIG. 4.
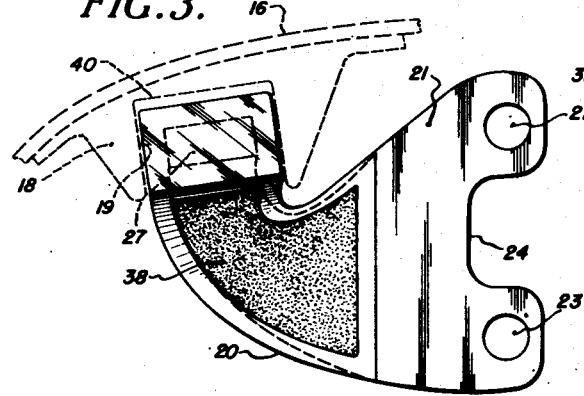
FIG. 3.
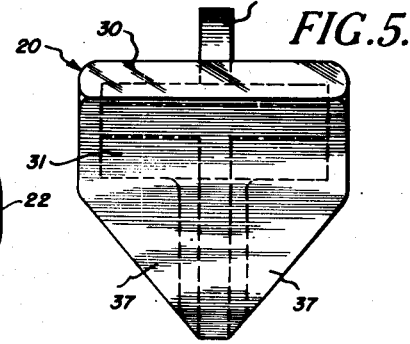
FIG. 5.
INVENTOR.
SAMUEL E. HINKLE
BY
McMorrow, Berman & Davidson
ATTORNEYS Patented June 23, 1953

2,642,853

UNITED STATES PATENT OFFICE 2,642,853

MOUNTING FOR AIRCRAFT ENGINE COWLS

Samuel E. Hinkle, Houston, Tex.

Application January 17, 1950, Serial No. 138,981

3 Claims. (Cl. 123—41.7)

This invention relates to mountings for aircraft engine cowls and more particularly to a resilient mounting bracket for supporting a cowl on a radial type aircraft engine.

It is among the objects of the invention to provide an improved cowl mounting bracket assembly including bracket units which can be mounted directly on the engine cylinders with no modification of the existing engine construction to receive cowl mounted socket units and provide a cushion of resilient material between each engine mounted bracket unit and the corresponding cowl mounted unit, which bracket assembly is effective to firmly hold the cowl against radial and rotational movements relative to the engine and also against forward and rearward movements and will suppress vibration between the engine and cowl and preclude the transmission of static electricity, and which is simple and economical to manufacture, resistant to wear and renewable by merely replacing the resilient cushions, and which supports the cowl without the use of connectors, such as bolts or screws, which would have to be released in order to remove the cowl from the engine.

Other objects and advantages will become apparent from a consideration of the following description and the appended claims in conjunction with the accompanying drawing wherein:

Figure 1 is a diagrammatic side elevation of a radial type aircraft engine and an engine driven propeller with an engine surrounding cowl shown in substantially diametrical cross section and a mounting bracket assembly illustrative of the invention connected between the engine and the cowl;

Figure 2 is a perspective view of a cowl mounting bracket illustrative of the invention;

Figure 3 is a side elevational view of an engine mounting bracket illustrative of the invention showing how the bracket fits into a cowl mounted socket to support the cowl on the engine;

Figure 4 is a top plan view of the bracket, a portion being broken away and shown in cross section to better illustrate the construction thereof; and Figure 5 is an end elevational view of the bracket looking at the left-hand end of the bracket as illustrated in Figure 3.

With continued reference to the drawing the radial engine, generally indicated at 10, is mounted on an engine mounting ring 11 by the resilient engine mounts 12 and each cylinder head of the engine has formed thereon a forwardly projecting lug 13 of substantially rectangular shape and having adjacent its forward edge two apertures 14 spaced apart in a direction radially of the engine, the lugs 13 being provided for the attachment of cowl supporting brackets to the engine. In the case of a nine cylinder radial engine there would be nine lugs 13 arranged substantially in a circle concentric with the engine axis and spaced apart at substantially equal angular intervals around such circle. The engine cowl 15 is generally cylindrical or annular in shape and of a size to receive the engine 10 therein. This cowl is supported on the engine substantially coaxially of the engine and has an inwardly curved front end, as indicated at 16, terminating in a bead 17 which surrounds the circular opening provided in the front end of the cowl for the admission of cooling air to the engine.

In the case of a nine cylinder engine, nine socket elements 18 are mounted in the inwardly curved front portion of the cowl and are spaced apart at angular intervals substantially equal to the intervals between the engine carried lugs 13.

Each socket structure or formation 18 is usually a metal casting, preferably formed of a light weight metal, such as aluminum, and is provided with a recess 19 of rectangular shape having its major length extending in a direction circumferentially of the cowl. Alternatively, an annular cowl former of channel shaped cross section may be used in place of the socket elements and this former will have transverse partitions which serve as stops to hold the cowl against rotation relative to the engine.

In accordance with the present invention each of the socket structures 18 is supported from a corresponding engine carried lug 13 by a bracket or bracket assembly, generally indicated at 20.

The bracket assembly, generally indicated at 20, comprises a bracket formed of a strong metal, such as steel, and a boot or cushion of resilient material, such as rubber, encloses a portion of the bracket.

The bracket 20 includes a flat arm 21 having a wide end and a narrow end and provided at its wide end with two spaced apart bolt holes 22 and 23 for the reception of bolts extending through the apertures 14 in the corresponding engine head lug 13 for rigidly connecting the bracket to the corresponding engine cylinder. Between the bolt holes 22 and 23 the wider end of the arm 21 is recessed or cut away, as indicated at 24, to restrict the area of the bracket arm in contact with the corresponding lug 13 and thereby reduce the heat transferred from the engine cylinder head to the bracket and to also reduce the total weight of the bracket. The radially inner edge of the bracket, when the bracket is operatively mounted on an engine, as illustrated in Figure 1, is arcuately curved, as indicated at 25, and the radially outer edge of the bracket arm has a reversed or ogee curvature, as indicated at 26. A rectangular head 27 is secured on the smaller end of the bracket arm 21 and has an outer face which is substantially perpendicular to the side surfaces of the arm 21. This head also has two spaced apart, substantially parallel side surfaces which extend perpendicularly inward from the outer face of the head and two spaced apart, substantially parallel end surfaces which are perpendicular to both the outer face and the side faces or surfaces and are disposed at substantially equal distances from the arm 21 at respectively opposite sides of the arm.

The outer faces of the bracket heads 27 are angularly disposed to the corresponding bracket arms 21 so that when all of the brackets are mounted on the engine these outer surfaces lie substantially in a cylindrical or conical surface which is coaxial with the engine. The length and width of the head 27 are less than the length and width of the socket recesses 19 in the socket structures 18 by an amount substantially equal to double the wall thickness of the resilient boot or cushion 28 so that the bracket head with the cushion or boot thereon can be readily inserted into the socket recess of the corresponding cowl mounted socket structure.

The resilient boot or cushion 28 is formed of a resilient material such as an oil resistant synthetic rubber and is molded and vulcanized or otherwise bonded onto the corresponding bracket of the bracket assembly 20.

The boot 28 has a hollow, rectangular end portion 29 interiorly dimensioned to closely fit the bracket head 27 and exteriorly dimensioned to closely fit the socket recess 19. This rectangular end portion has five operative surfaces including the outer face or surface 30, the two side surfaces 31 and 32 and the two end surfaces 33 and 34, the side surfaces 31 and 32 and the end surfaces 33 and 34 being perpendicular to the outer face surface 30 and the end surfaces being perpendicular to the side surfaces.

The boot further includes a skirt portion 35 which extends from the open side of the end portion 28 opposite the face 30 and has its outer and inner edges curved to fit the curved inner and outer edges of the bracket arm 21. Along its outer edge the skirt portion of the boot is provided with webs 36 which taper from the correspondingly opposite ends of the end portion 28 to the open end of the boot which is located about midway of the length of the arm 21 and along the outer edge the skirt portion of the boot is provided with webs or ribs 37 which also taper from the correspondingly opposite ends of the end portion 28 to the open end of the boot. On each side of the skirt between the outer rib 37 and the inner rib 36 there is a cavity 38 which reduces the wall thickness of the skirt between the ribs 36 and 37 to substantially the same wall thickness as that of the end portion 28 enclosing the head 27 of the bracket and reduces the weight of the resilient cushion or boot secured on the bracket.

The ribs 36 and 37 not only reinforce the boot construction and provide a streamlined shape, but also act as heat dissipating fins to keep the resilient boot as cool as possible.

When a full set of bracket assemblies are mounted on the engine the outer faces 30 of the resilient boots are disposed substantially in a cylindrical or conical surface concentric with the engine and of substantially the same size as the portion of the cowl in which the bracket structures are secured. These surfaces hold the cowl against movement radially of the engine. The side surfaces 31 and 32 in cooperation with the side walls of the recesses 19 in the socket structures or the channel in a cowl former, hold the cowl against movement forwardly and rearwardly of the engine and some of the end surfaces 33 and 34 in cooperation with the end walls of the recesses 19 or partitions in the former channel hold the cowl against rotation relative to the engine. One bracket in each cowl section is sufficient to hold the cowl against rotation.

The outer surfaces of the bracket assemblies are spaced from the bottoms of the sockets or the bottom of the cowl former channel, as indicated at 40 in Figure 3, when the engine is cold so that the radial engine can expand as it warms up without unduly stressing the cowl.

Engine cowls of the character indicated are normally made in two or more partly annular pieces and these cowl pieces can be quickly and easily mounted on the engine by merely inserting the bracket head enclosing portions of the bracket boots in the recesses 19 in the socket structures 18 carried by the cowl pieces and then securing the cowl pieces together by the buckles or clamps provided for that purpose. There are thus no fasteners, such as bolts or screws, extending through the cowl which would have to be unfastened before the cowl could be removed from the engine and the removal and installation of the cowl is thus facilitated. The boots or cushions of resilient material suppress vibration between the engine and the cowl and reduce wear of the associated bracket and socket structures and also resist the transmission of electric currents, such as those caused by static electricity, between the cowl and the engine.

If the portions of the boots received in the socket structures do become worn the worn boots can be stripped from the brackets and replaced by new boots or cushions so that the mounting installation can be restored inexpensively and with the retention of the old brackets.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Means for mounting a cowl provided with socket structures on a radial engine provided on each cylinder head with an apertured cowl supporting lug comprising a plurality of bracket assemblies each adapted to be secured at one end to an engine carried lug and to be received at its opposite end in a corresponding cowl carried socket, each of said bracket assemblies comprising a flat arm having a wide end and a narrow end and curved edges between its wide end and its narrow end, a rectangular head secured on the narrow end of said arm, and a cushion of resilient material enclosing said head and the head adjacent portion of said arm with its head enclosing portion dimensioned to fit closely into a cowl carried socket.

2. Means for mounting a cowl provided with socket structures on a radial engine provided on each cylinder head with an apertured cowl supporting lug comprising a plurality of bracket assemblies each adapted to be secured at one end to an engine carried lug and to be received at its opposite end in a corresponding cowl carried socket, each of said bracket assemblies comprising a flat arm having a wide end and a narrow end and curved edges between its wide end and its narrow end, a rectangular head secured on the narrow end of said arm, and a cushion of resilient material enclosing said head and the head adjacent portion of said arm with its head enclosing portion dimensioned to fit closely into a cowl carried socket, the head enclosing portion of each resilient cushion having five operative surfaces including an outer face surface for supporting an associated socket against movement radially inward of an associated engine, two spaced apart side surfaces disposed substantially perpendicular to said outer face surface for supporting an associated socket against movements forwardly and rearwardly of the engine, and two spaced apart end surfaces substantially perpendicular to said outer face surface and to said side surfaces for supporting an associated socket against movements rotationally of the engine.

3. In combination with a radial engine having cylinder heads each of which is provided with an outwardly projecting apertured lug and a cowl surrounding said engine, means mounting said cowl on said engine comprising sockets disposed at the inner side of said cowl one adjacent each of said lugs and firmly secured to said cowl, arms disposed one adjacent each of said lugs and each rigidly secured at one end to the corresponding lug with its other end disposed within the adjacent socket, and boots of elastic material disposed one on each of said arms, each of said boots receiving said other end of the corresponding arm and being disposed within the associated socket to provide an elastic cushion between the arm and the socket.

SAMUEL E. HINKLE.

References Cited in the file of this patent

UNITED STATES PATENTS

| Number | Name | Date |
|---|---|---|
| 1,698,328 | Duffie | Jan. 8, 1929 |
| 1,940,895 | Wacker | Dec. 26, 1933 |
| 2,319,843 | Berlin et al. | May 25, 1943 |
| 2,329,606 | Goodman | Sept. 14, 1943 |
| 2,395,949 | Wilkins | Mar. 5, 1946 |

FOREIGN PATENTS

| Number | Country | Date |
|---|---|---|
| 416,065 | Great Britain | Sept. 10, 1934 |